Figure 1:
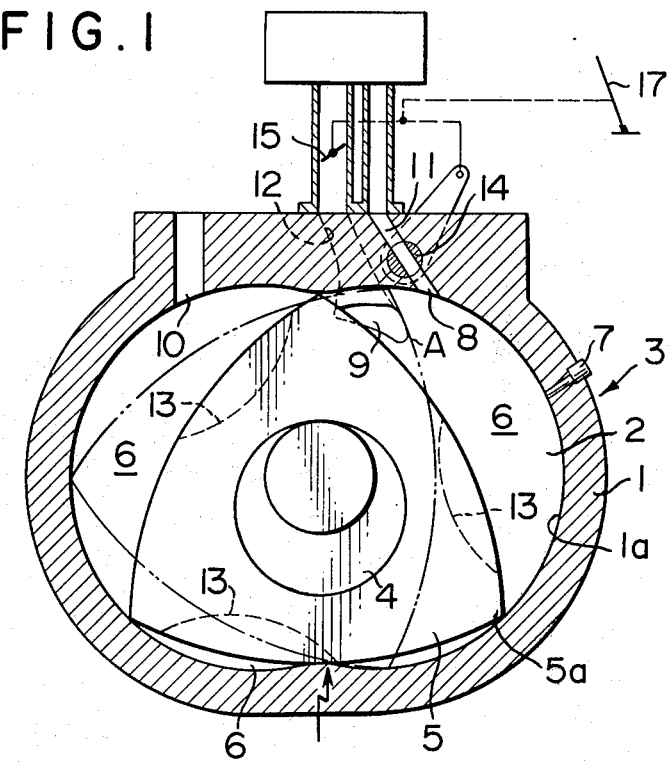

United States Patent [19]

Satow et al.

[11] 3,958,539
[45] May 25, 1976

[54] FUEL INJECTION TYPE ROTARY PISTON ENGINE

[75] Inventors: Haruhiko Satow; Masaharu Shimoji, both of Hiroshima, Japan

[73] Assignee: Toyo Kogyo Co., Ltd., Japan

[22] Filed: Apr. 22, 1975

[21] Appl. No.: 570,997

[30] Foreign Application Priority Data
Apr. 29, 1974 Japan............................... 49-48570

[52] U.S. Cl. ............................................. 123/8.09
[51] Int. Cl.² ........................................... F02B 53/10
[58] Field of Search................... 123/8.09, 8.11, 8.13

[56] References Cited
UNITED STATES PATENTS
3,901,198  8/1975  Yamamoto ...................... 123/8.09
3,905,337  9/1975  Shimoji et al...................... 123/8.09

*Primary Examiner*—Carlton R. Croyle
*Assistant Examiner*—Michael Koczo, Jr.
*Attorney, Agent, or Firm*—Fleit & Jacobson

[57] ABSTRACT

Fuel injection type rotary piston engine having side and peripheral intake ports, said side intake port being closed in light load operation and said peripheral port in heavy load operation, said peripheral port having an area which is small in relation to the side port and being closed in each intake stroke after bottom dead center position of the rotor.

5 Claims, 2 Drawing Figures

FUEL INJECTION TYPE ROTARY PISTON ENGINE

The present invention relates to rotary piston type internal combustion engines, and more particularly to rotary piston engines of such a type that includes a casing which comprises a rotor housing having a trochoidal inner wall surface and a pair of side housings secured to the opposite sides of the rotor housing, and a substantially polygonal rotor disposed in said casing for revolution and rotation with apices thereof in sliding contact with the trochoidal inner wall so as to define working chambers in the casing. More particularly, the present invention pertains to fuel injection type rotary piston engines having the aforementioned type of casing and piston.

It has been known that a fuel injection type rotary piston engine in which fuel is directly injected into a working chamber in intake stroke is advantageous in that it is possible to locally condense atomized fuel in the working chamber to obtain stratified air-fuel mixture which results in an improved fuel consumption and a decrease in the amount of noxious constituents in the engine exhaust gas. However, such a type of rotary piston engine is disadvantageous in that only a limited time is available for mixing the injected fuel with the air introduced into the working chamber so that, during light load operation of the engine in which the amount of air flow into the working chamber is very small and the flow speed of the intake air is very low, an adequate atomization of fuel cannot be obtained. Thus, an appreciable amount of fuel may deposit on the rotor surface in liquid form resulting in an increase in fuel consumption and also in the amount of noxious constituents in the exhaust gas.

In order to eliminate the above problem, the inventors have proposed by the U.S. patent application Ser. No. 463,830, now U.S. Pat. No. 3,901,198, to provide, in fuel injection type rotary piston engine, a peripheral intake port in the rotor housing in addition to a side intake port formed in one of the side housings and use only the peripheral intake port during light load operation of the engine.

The present invention has an object to improve the engine as proposed by the aforementioned patent application.

Another object of the present invention is to provide a rotary piston type engine in which problem of blow back of intake air into intake passage means can be substantially eliminated.

According to the present invention, the above and other objects can be achieved by a fuel injection type rotary piston engine including a rotor casing which comprises a rotor housing having a trochoidal inner wall and a pair of side housings secured to the opposite sides of the rotor housing to define a rotor chamber therein, a substantially polygonal rotor disposed in said rotor chamber for revolution and rotation therein with apices thereof in sliding contact with said trochoidal inner wall of the rotor housing so as to define working chambers of variable volume between the casing and the rotor, first air intake port means formed in at least one of said side housings so as to open into the rotor chamber so that it cyclically communicates with one of the working chambers which is in intake stroke, first intake passage means communicating with said first air intake port means and having first throttle valve means disposed therein, second intake port means formed in said rotor housing so as to open into the rotor chamber so that it cyclically communicates with the working chamber in intake stroke, second air intake passage means communicating with said second air intake port means and having second throttle valve means disposing therein, means for closing said first throttle valve means in said first air intake passage means during light load operation of the engine while the second throttle valve of said second air intake passage means is still open, means for closing said second throttle valve means during heavy load operation of the engine while the first throttle valve is opened, said second air intake port means having effective area smaller than that of the first intake port means, said second intake port means being located in such a position that it is closed after the rotor has passed through a position in which the related working chamber has the maximum volume and also after the first intake port means has been closed, and fuel injection means for injecting fuel into the working chamber in intake stroke.

Hithertofore, it has been recognized that an air intake port formed in the side housing is particularly suitable for light load or low speed operation since it can minimize the overlapping period in which the port communicates with the working chamber in intake stroke as well as the working chamber in exhaust stroke. Further, it has also been recognized that a peripheral air intake port formed in the rotor housing is particularly suitable for heavy load or high speed operation because it can provide an increased air intake efficiency although there may be relatively large overlapping period. The rotary piston engine as disclosed in the aforementioned patent application is unique in that it is against the common knowledge and proposes to use only the peripheral air intake port means during light load or low speed operation of the engine in order to attain a better atomization of fuel and to provide a stratified air-fuel mixture in the intake working chamber. The engine in accordance with the present invention provides further advantages over the engine of the co-pending patent application in that it can substantially decrease the overlapping period and prevent blow back of intake air into the intake passage means since the peripheral port is closed after bottom dead center and later than the side intake port, and also it is closed during the heavy load operation. The ratio of the effective area of the peripheral intake port means to that of the side intake port means may be determined in accordance with various factors of the engine but a preferable ratio will be between 1:3 to 1:18.

Figure 2:
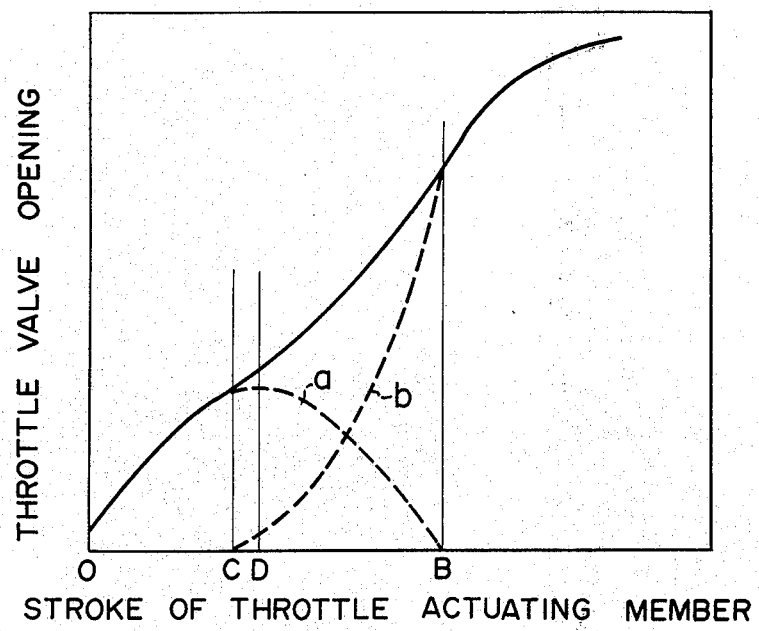

The above and other objects and features of the present invention will become apparent from the following descriptions of a preferred embodiment of the present invention taking reference to the accompanying drawings, in which:

FIG. 1 is a schematic sectional view of a rotary piston engine embodying the features of the present invention; and FIG. 2 is a diagram showing a typical relationship between the total effective area of the intake passage means and the stroke of throttle valve actuating means.

Referring now to the drawings, particularly to FIG. 1, there is shown a rotary piston engine including a casing 3 which comprises a rotor housing 1 and a pair of side housings 2 secured to the opposite sides of the rotor housing 1. The rotor housing 1 has a two-lobed trochoidal inner wall surface 1a so that a trochoidal rotor chamber is defined in the casing 3. A substantially triangular rotor 5 is disposed in the rotor chamber with apex portions 5a in sliding contact with the inner wall surface 1a of the rotor housing 1. Thus, three working chambers 6 of variable volume are defined by the casing 3 and the rotor 5. The rotor 5 is supported by an eccentric shaft 4 as well known in the art. The volume of each working chamber 6 cyclically changes as the rotor 5 rotates. The rotor 5 is formed with a recess 13 in each of peripheral portions between two adjacent apex portions 5a for the purpose which will be described later.

The rotor housing 1 is formed with an intake port 8 opening to the rotor chamber at a working chamber 6 which is in intake stroke and an exhaust port 10 at a working chamber 6 which is in exhaust stroke. The rotor housing 1 further provided with a fuel injection nozzle 7 at the working chamber in intake stroke. The nozzle 7 is connected with fuel injection pump (not shown) in a manner well known in the art and inclined in the direction of rotation of the rotor 5 so that fuel is injected into the intake working chamber 6 toward the leading side thereof.

The casing 3 is formed at one or each of the side housings 6 with a side intake port 9. The side intake port or ports 9 have area which is sufficient for supplying air required in heavy load operation. It is preferred that both of the side housings 2 are formed with such side intake ports 9 because, in such an arrangement, each of the side intake port 9 can be of a smaller area so that overlap period between the intake and exhaust working chambers can be remarkably decreased.

The peripheral intake port 8 is connected with a first intake passage 11 having a first throttle valve 14 and the side intake port 9 with a second intake passage 12 having a second throttle valve 15. The first intake passage 11 is so directed that intake air therefrom flows substantially along the inner wall 1a of the rotor housing 1 at the intake working chamber 6. This arrangement of the first intake passage 11 provides an advantage that a swirl of intake air is produced along the inner wall 1a and the surface of the recess 13 which is located on the rotor 5 at the leading side of each peripheral portion between two adjacent apex protions 5a. Thus, according to the illustrated arrangement, fuel-air mixture can be formed mainly in the leading portion of the intake working chamber.

The first and second throttle valves 14 and 15 are interconnected with each other and adapted to be actuated by means of a throttle control pedal 17. The first throttle valve 14 is connected with the pedal 17 in such a manner that its opening is controlled as shown by a curve a in FIG. 2. Thus, the throttle valve 14 is opened as far as the stroke of the pedal 17 is smaller than that shown by B in FIG. 2 but it is closed when the pedal 17 is moved beyond the point B. In other words, the throttle valve 14 is opened during light and medium load operation of the engine, but closed during heavy load operation. The second throttle valve 15 is controlled as shown by a curve b in FIG. 2. Thus, it is closed when the stroke of the pedal 17 is smaller than that shown by c which is smaller than the stroke represented by B in FIG. 2, but it is opened and the opening is continuously increased at the pedal 17 is moved beyond the point C. As noted in FIG. 2, the second throttle valve 15 is started to open before the first throttle valve 14 reaches the full open position as shown by D in FIG. 2. Thus, as seen in FIG. 2, the total effective area of the intake passages 11 and 12 increases smoothly in response to an increase in the stroke of the pedal 17. It should be noted herein that, if the second throttle valve 15 is opened at an excessively early part of the stroke of the pedal 17, an adverse effect will be encountered in obtaining stratified air-fuel mixture.

The peripheral intake port 8 has an area which is small as compared with that of the side intake port 9 in order that the flow speed of intake air can be increased during light load operation of the engine in which the amount of intake air is comparatively small. The preferable ratio of the effective area of the peripheral intake port 8 to that of the side intake port 9 is between 1:3 to 1:18 and may depend on the size and other factors of the engines. Further, the peripheral intake port 8 is located at a position which is offset toward leading side or direction of rotation of the rotor 5 in relation to the position of the adjacent apex portion 5a of the rotor 5 at the bottom dead center wherein the intake working chamber 6 possesses the maximum volume. The peripheral intake port 9 has a length as measured in the direction of rotation of the rotor 5, which is smaller than the width thereof. The location and the configuration of the peripheral intake port 9 is effective to minimize the overlap period wherein the intake port 9 and the exhaust port 10 simultaneously opens to the same working chamber.

The side intake port 9 may be closed slightly after the bottom dead center, however, since the side intake port 9 is intended to be used in heavy load operation, if the closing timing of the side intake port 9 is excessively delayed, blow back of intake air into the intake passage may be produced around the end of intake stroke resulting in a decrease in the engine output.

In operation, when the stroke of the pedal 17 is less than that shown by C in FIG. 2, the second throttle valve 15 is closed and intake air is introduced into the intake working chamber 6 only through the peripheral intake port 8. Since the port 8 has a small area, the intake air flow can be of an adequate speed to flow along the trochoidal wall surface toward the leading side of the working chamber 6. The intake air is then intersected and mixed with stream of fuel injected through the nozzle 7 and the mixture of air and fuel thus formed is directed toward the leading side of the working chamber 6 forming a swirling stream. Thus, the fuel injected through the nozzle 7 is swirled and mixed with the air to a satisfactory extent and atomization of fuel is also facilitated in this period.

During medium load operation, the pedal 17 is actuated beyond the point C to open the second throttle valve 15. Therefore, air is introduced into the working chamber 6 through a side intake port 9 as well as the peripheral intake port 8. When the side intake port 9 is opened, the amount of air introduced into the working chamber 6 through the peripheral intake port 8 may be decreased. However, in the loaded operating zone where the pedal 17 is actuated beyond the point C, the total amount of intake air is so increased that an adequate flow speed can be maintained through the side intake port 9. Therefore, the fuel injected through the nozzle 7 is well mixed with air with satisfactory extent of atomization. As the pedal 17 is actuated beyond the point D, the first throttle valve 14 is gradually closed and when the actuation of the pedal 17 has reached the point B, the first throttle valve 14 is completely closed. In this instance, the first and second throttle valves 14 and 15 are so interconnected that the total passage area of the first and second intake passages 11 and 12 increases smoothly in accordance with an increase in the stroke of the pedal 17 as shown in FIG. 2.

In heavy load operation, the pedal 17 is actuated beyond the point B so that the first throttle valve 14 is closed and air is introduced only through the side intake port 9. Since the peripheral intake port 8 is closed and the side intake port 9 is so located that it is closed at a relatively early timing, it is possible to prevent blow back of air into the intake passages at the final period of the intake stroke. It is preferable in the present invention to locate the throttle valve 14 as close to the intake port 8 as possible for the purpose of preventing blow back of intake air into the passage 11.

As described above, according to the present invention, air is introduced only through the peripheral intake port during light load operation of the engine so as to maintain an adequate flow speed of intake air. Further, in heavy load operation, air is introduced only through the side intake port so that blow back of intake air can be effectively prevented.

The invention has thus been shown and described with reference to a specific embodiment, however, it should be noted that the invention is in no way limited to the details of the illustrated structures but changes and modifications may be made without departing from the scope of the appended claims.

We claim:

1. Fuel injection type rotary piston engine including a rotor casing which comprises a rotor housing having a trochoidal inner wall and a pair of side housings secured to the opposite sides of the rotor housing to define a rotor chamber therein, a substantially polygonal rotor disposed in said rotor chamber for revolution and rotation therein with apices thereof in sliding contact with said trochoidal inner wall of the rotor housing so as to define working chambers of variable volume between the casing and the rotor, first air intake port means formed in at least one of said side housings so as to open into the rotor chamber so that it cyclically communicates with one of the working chambers which is in intake stroke, first intake passage means communicating with said first air intake port means and having first throttle valve means disposed therein, second intake port means formed in said rotor housing so as to open into the rotor chamber so that it cyclically communicates with the working chamber in intake stroke, second air intake passage means communicating with said second air intake port means and having second throttle valve means disposed therein, means for closing said first throttle valve means in said first air intake passage means during light load operation of the engine while the second throttle valve of said second air intake passage means is still open, means for closing said second throttle valve means during heavy load operation of the engine while the first throttle valve is opened, said second air intake port means having effective area smaller than that of the first intake port means, said second intake port means being located in such a position that it is closed after the rotor has passed through a position in which the related working chamber has the maximum volume and also after the first intake port means has been closed, and fuel injection means for injecting fuel into the working chamber in intake stroke.

2. Fuel injection type rotary piston engine in accordance with claim 1 in which both of the first and second throttle valve means are at least partially opened in medium load operation so that total opening of said first and second intake port means smoothly increases from light load through medium load to heavy load operations.

3. Fuel injection type rotary piston engine in accordance with claim 1 in which said second intake passage means is inclined in the direction of the rotor rotation.

4. Fuel injection type rotary piston engine in accordance with claim 1 in which said second throttle valve means is located in close proximity with the second intake port means.

5. Fuel injection type rotary piston engine in accordance with claim 1 in which the ratio of effective area of said second intake port means to that of said first intake port means is between 1:3 and 1:18.

* * * * *